May 27, 1958      J. PIOCHET      2,836,655
LISTENING DEVICE FOR DETECTING FLUID FLOWS
Filed Nov. 10, 1954
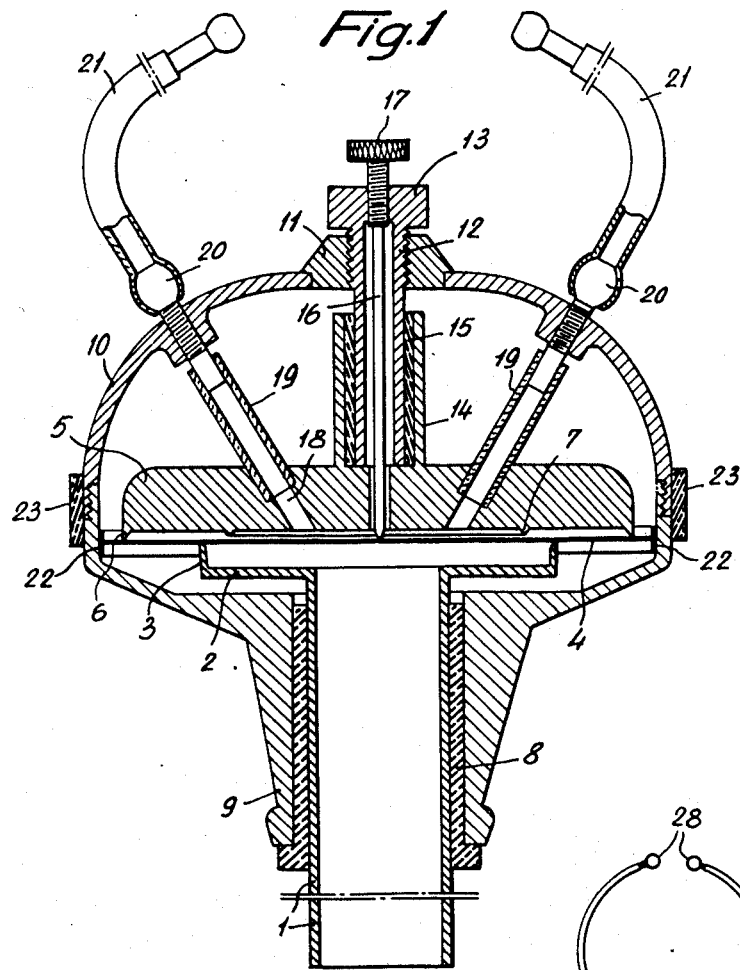
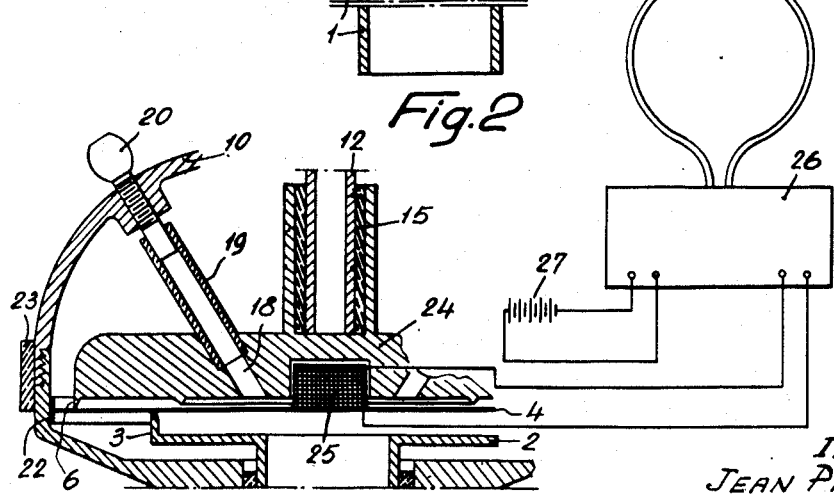
INVENTOR
JEAN PIOCHET
By   *Frederick L. Ware*
ATTORNEY

United States Patent Office 2,836,655
Patented May 27, 1958

2,836,655

LISTENING DEVICE FOR DETECTING FLUID FLOWS

Jean Piochet, Soleines, France

Application November 10, 1954, Serial No. 468,083

Claims priority, application France November 16, 1953

10 Claims. (Cl. 179—1)

This invention relates to an apparatus for detecting the flow of fluids, for example water leaks, of the type comprising a metal member adapted to collect sound vibrations, a vibration-responsive flexible member adapted to amplify mechanically the vibrations transmitted from the metal member, and a listening device enabling the user to hear the amplified sound vibrations.

The essential feature of this invention lies in that the member adapted to amplify mechanically the vibrations received by the apparatus consists of a diaphragm engaged on its two faces respectively and along concentrical, different circles, on the one hand by the sound-vibration collecting member and on the other hand by a bearing body adapted to tension the diaphragm.

The purpose of the engagement of the vibration collecting member and bearing body on the opposite faces of the diaphragm along concentrical circles generally closely adjacent to the outer peripheral edge of the diaphragm, respectively, is to subject the diaphragm to amplified vibrations occurring in the absence of any external interference since each diaphragm radius is comparable to an amplifying lever having its fulcrum positioned adjacent to one end of the lever and a movable point very close thereto, whilst its central portion is freely responsive to amplified vibrations.

According to a complemental feature of this invention, the pressure exerted by the bearing body on the outer peripheral edge of the diaphragm is adjustable so that the tension to which the diaphragm is subjected may be varied to tune the apparatus to different acoustic frequencies. Thus, the greater the diaphragm tension, the higher the sound frequencies to which the apparatus will be responsive.

The adjustment may be designed to cause the bearing body to exert a pressure onto the diaphragm along a circle of variable diameter, thereby enabling the amplifying lever arm constituted by each diaphragm radius to be varied at will.

Moreover, by providing a second adjustment means, an additional bearing circle may be provided centrally of the diaphragm so as to reduce the diametral length of the diaphragm between two bearing circles, so that the diaphragm will be tuned to higher frequency ranges.

Furthermore, this invention provides a device of the type broadly specified hereinabove, wherein the bearing body may consist of a magnetic metal to form a permanent magnet associated with a small electric coil carried by the diaphragm, and the voltage variations created in the coil may be amplified electrically by a tube amplifier of known description having its output connected to one or two earphones. As the low frequencies acting on the diaphragm are within the sound range, this amplifier may be of very simple design and comprise only a limited number of tubes, or even a single tube, as will readily occur to anybody conversant with the art.

It will be observed that if a permanent magnet is employed as a bearing body for electrical amplification purposes, the members ensuring the mechanical amplification will also assist in the electrical amplification, so that the design will be greatly simplified and the listener will be able to listen either directly, i. e. through mechanical amplification, or indirectly, i. e. through electrical amplification. If desired, the listener may even listen through mechanical amplification with one ear and through electrical amplification with the other ear.

In the case of direct listening, it will be sufficient to connect stethoscope earphones through adequate tubes to channels formed in the bearing body and leading to a position adjacent to the diaphragm in the cavity formed between this diaphragm and the bearing mass.

Preferably, the diaphragm will consist of a thin disc of a suitable metal. Although a disc of uniform thickness may be used, it will be advantageous to form with a press or like machine a plurality of zones of different thicknesses to facilitate its vibration. Thus, the disc may comprise relatively thin segments distributed at spaced intervals around the centre and alternating with thicker segments. If necessary, small concentrical corrugations may also be formed in the disc.

The vibration collecting member may consist of a tubular member of relatively great length comprising at its inner or diaphragm end an annular flange formed with air inturned peripheral edge or collar. This flange, the diaphragm bearing thereon, the bearing body engaging the opposite face of the diaphragm, and one portion of the adjustment mechanism may be enclosed within a case supported by the tubular member through the medium of an insulating sleeve to damp out any vibration from the case to the tubular member. One portion of this case, which surrounds the tubular member, may constitute a handle sound-insulated with respect to the vibrating system of the apparatus.

The attached drawing forming part of this specification illustrated diagrammatically by way of example two practical embodiments of the invention which are given solely for illustrative purposes and should not be construed as limiting the scope of the invention. In the drawing:

Figure 1 shows an axial section of a first embodiment intended for purely acoustical amplification listening;

Figure 2 is a fragmentary section similar to Figure 1 showing a modified embodiment adapted for acoustical amplification or electrical amplification, or both.

In the example illustrated in Figure 1, the sound vibrations are collected by a metal tube 1 of relatively great length having its lower or remote end adapted for example to be applied either onto a water duct for detecting the flow therethrough, or onto the ground. At its upper or outlet end the tubular member 1 is formed with an annular flange 2 formed in turn with a cylindrical or peripheral in-turned edge 3 bearing directly against the lower face of a metal diaphragm 4. Overlying this diaphragm 4 is a bearing body 5 comprising on the diaphragm side a circular peripheral edge 6 adapted to contact this diaphragm 4. The bearing body 5 may be formed with an additional inner concentrical edge 7 projecting slightly less than the other edge 6 from the lower face of the bearing body 5, so that under normal conditions the pressure will be exerted by the body 5 through its outer projecting edge 6 on the diaphragm 4, the inner concentrical edge 7 engaging the diaphragm only after a suitable adjustment device has been operated, as will be seen presently.

The tube 1 has mounted on its upper end somewhat below the flange 2 a sleeve 8 of vibration insulating material, for example soft rubber, and this sleeve 8 has fitted on its outer surface the tubular portion of a case member 9 acting at the same time as a handle for holding the apparatus. The case member 9 is open at the top and adapted to be connected, for example through a screwthread or bayonet coupling, to a cup-shaped cover 10; this cover 10 is provided at its centre with a nut-forming member 11 adapted to receive a screwthreaded portion of a tubular member 12 formed with an outer milled or like head 13, the lower end of this tubular member 12 bearing on the upper face of the bearing body 5, i. e. the face opposite to the diaphragm-engaging face thereof. This upper face of the bearing body 5 is formed with a rising tubular element 14 surrounding the tube 12 and serving the purpose of guiding and maintaining the bearing body 5; a flexible rubber sleeve 15 may be interposed between the tubular members 12 and 14.

If desired, the apparatus may be provided with an additional adjustment device. In this case the milled head 13 is formed with an axial bore topped to receive the screwthreaded portion of a shank 16 formed integrally with a milled or like head 17 positioned externally of the head 13. The lower end of the shank 16 extends through an axial orifice formed in the bearing body 5 and is adapted to engage the diaphragm centre when the adjustment head 17 is properly operated.

The bearing body 5 is also formed with oblique channels 18 and flexible pipes 19 connects these channels to tubular fittings 20 mounted in the cover 10. On these fittings 20 there may be threaded flexible pipes 21 leading to earphones, preferably of the type provided on stethoscopes and adapted to be inserted in the listener's ears.

The diaphragm 4 is mounted freely in the case between the bearing circles defined hereinabove, but its outer peripheral edge, although not clamped, may be held by means of a suitable lining 22, for example of felt, adjacent to the inner wall of the case 9. A rubber protective ring 23 may be threaded around the outer periphery of the case to protect the apparatus against shocks and falls.

When the lower end of the tubular member 1 has been applied on the location to be explored (for example the ground or a water duct) the diaphragm tension may be adjusted by means of the head 13; this, when the body 5 is moved toward the tube 1 the diaphragm tension is increased and tuned to a higher frequency range. From a certain position of the adjustment button the pressure exerted by the body 5 on the diaphragm is transmitted through the inner circular edge 7 more adjacent to the collar edge 3 than the outer circular edge 6, and as a result the amplification range is increased. The adjustment button 17 makes it possible to contact the centre of the diaphragm 4 and to hold it against movement, this further increasing the diaphragm tension and tuning same to a still higher frequency range. When the earphones attached to the pipes 21 are inserted into the listener's ears the slightest sounds produced at the lower end of the tubular member 1, for example in a water duct or in the soil, are heard with an astonishing amplification. With this apparatus the faintest flows may be detected.

In the alternate embodiment illustrated diagrammatically in Figure 2, the bearing body 24 consists of magnetic steel and acts as a permanent magnet associated with a small coil 25 carried by the central portion of the diaphragm. This coil may be connected to a tube amplifier 26 fed with an adequate voltage from a suitable battery 27 and having its output connected in turn to the pair of earphones 23. The bearing body 24 may be formed with channels 18 like those described hereinabove in connection with the embodiment of Figure 1, so that the user may listen through either the mechanical amplifying means or the electrical amplifying means, at will. A combination of both systems may even be used by listening with one ear through an earphone connected to the mechanical amplification and with the other ear through another earphone 28 connected to the electrical amplifier 26.

It will be observed that certain component elements of the electrical amplifier may be located inside the tube 1, thereby reducing the over-all dimensions of the assembly and permitting the construction of a portable apparatus equipped with electrical amplifying means which is very easy to handle and simple to operate.

Whilst only two practical embodiments of the invention are described hereinabove with reference to the attached drawing, it will be readily understood by anybody conversant with the art that many modifications may be brought thereto without departing from the scope of the invention as set forth in the appended claims.

Having thus described and ascertained the nature of my said invention and in what manner the same is to be performed, I declare that what I claim is:

1. A sound-amplifying listening apparatus for detecting the flow of fluids by audible sound waves, comprising a casing, a tubular metal member mounted with one end in said casing, the other end being adapted to collect sound waves caused by a flow of fluid to be detected, a metal diaphragm disposed within the casing in sound transmitting relationship with the diaphragm, said tubular member engaging one face of said diaphragm a bearing mass in pressure engagement with the opposite face of the diaphragm for tensioning the same, said tubular member and said bearing mass respectively engaging the opposite faces of said diaphragm through circular edges of different diameters, and adjustment means coacting with said bearing mass for varying the pressure exerted by the mass upon said diaphragm to vary the tension of said diaphragm.

2. A sound-amplifying apparatus according to claim 1, wherein said bearing mass has a plurality of diaphragm-engaging circular edges, so that the pressure exerted by said bearing mass on said diaphragm being transmitted through any one of said circular edges according to the position of said adjustment means.

3. A sound-amplifying listening apparatus for detecting the flow of fluids by audible sound waves, comprising a tubular metal member adapted to collect sound waves, a metal diaphragm responsive to sound waves transmitted from said tubular member, said tubular member engaging one face of said diaphragm, a bearing mass adapted to tension said diaphragm by engaging the opposite face thereof, said tubular member on the one hand and said bearing mass on the other hand engaging the opposite faces of said diaphragm through circular edges of different diameters, first adjustment means enabling the pressure exerted by said bearing mass on said diaphragm to be altered by varying the tension of said diaphragm and also by changing the circular edge in contact with the diaphragm, and second adjustment means adapted to exert an additional pressure on the diaphragm centre for reducing the diametral length of the diaphragm portion between two bearing points and tuning the diaphragm to higher frequencies.

4. A sound-amplifying listening apparatus for detecting the flow of fluids by audible sound waves, comprising a tubular metal member adapted to collect sound vibrations, a metal diaphragm responsive to sound vibrations transmitted from said tubular member, said tubular member engaging one face of said diaphragm a bearing mass adapted to tension said diaphragm by engaging the opposite face thereof, said tubular member on the one hand and said bearing mass on the other hand engaging the opposite faces of said diaphragm through concentric circular edges of different diameters, said bearing mass consisting of a permanent magnet associated with a small electric coil carried by said diaphragm in the central region thereof, amplifier means, a source of voltage for supplying current to said amplifier means, listening means in sound transmitting relationship with said diaphragm, means for connecting said coil and said source of voltage to said amplifier means, on the one hand, and the output of said amplifier means to said listening means, on the other hand, and adjustment means enabling the pressure exerted by said bearing mass on said diaphragm to be altered by varying the tension of said diaphragm and also by changing the specific circular edge in contact with said diaphragm.

5. A sound-amplifying listening apparatus according to claim 3, wherein channels formed through said bearing mass open into the cavity formed between said diaphragm and said bearing mass, the opposite ends of said channels being connected through pipes to earphones.

6. A sound-amplifying listening apparatus according to claim 4, wherein channels are formed through said bearing mass and open into the cavity formed between said diaphragm and said bearing mass, the opposite ends of said channels being connected through pipes to earphones.

7. A sound-amplifying apparatus according to claim 3, wherein said diaphragm consists of a metal disc having portions of different thickness formed therein.

8. A sound-amplifying apparatus according to claim 4, wherein said diaphragm consists of a metal disc having portions of different thickness formed therein.

9. A sound-amplifying apparatus according to claim 3, wherein the collecting member consists of a tubular member of relatively great length formed at its diaphragm end with a flange of relatively large diameter, said flange, the diaphragm engaging said flange with one face, said bearing body engaging the opposite face of said diaphragm, and a portion of said adjustment means are enclosed within a case supported by said tubular member through the medium of an insulating sleeve of resilient material to prevent any vibrations from being transmitted to said tubular member, one portion of said case surrounding said tubular member at its diaphragm-engaging end and being adapted to act as a handle, and a second sleeve of resilient material surrounding said case to protect same against shocks.

10. A sound-amplifying apparatus according to claim 4, wherein the collecting member consists of a tubular member of relatively great length formed at its diaphragm end with a flange of relatively large diameter, said flange, the diaphragm engaging said flange with one face, said bearing body engaging the opposite face of said diaphragm, and a portion of said adjustment means are enclosed within a case supported by said tubular member through the medium of an insulating sleeve of resilient material to prevent any vibrations from being transmitted to said tubular member, one portion of said case surrounding said tubular member at its diaphragm-engaging end and being adapted to act as a handle, and a second sleeve of resilient material surrounding said case to protect same against shocks.

References Cited in the file of this patent

UNITED STATES PATENTS

| | | |
|---|---|---|
| 875,795 | Fosgate | Jan. 7, 1908 |
| 1,015,163 | Fosgate | Jan. 16, 1912 |
| 2,008,934 | Smith | July 23, 1935 |